United States Patent
Wollenschlaeger

[11] Patent Number: 6,055,697
[45] Date of Patent: May 2, 2000

[54] WINDSHIELD WIPER BLADE

[75] Inventor: Dieter Wollenschlaeger, Buehlertal, Germany

[73] Assignee: Robert Bosch GmbH, Stuttgart, Germany

[21] Appl. No.: 09/000,303

[22] PCT Filed: May 10, 1997

[86] PCT No.: PCT/DE97/00948

§ 371 Date: Jan. 21, 1998

§ 102(e) Date: Jan. 21, 1998

[87] PCT Pub. No.: WO98/04443

PCT Pub. Date: Feb. 5, 1998

[30] Foreign Application Priority Data

Jul. 29, 1996 [DE] Germany .......................... 196 30 510

[51] Int. Cl.$^7$ ....................................................... B60S 1/38
[52] U.S. Cl. ................................. 15/250.43; 15/250.454; 15/250.32
[58] Field of Search ........................... 15/250.38, 250.43, 15/250.44, 250.451, 250.452, 250.48, 250.361, 245, 250.453, 250.454, 250.32

[56] References Cited

U.S. PATENT DOCUMENTS

| | | |
|---|---|---|
| 2,659,097 | 11/1953 | Morton .................................. 15/250.38 |
| 2,712,146 | 7/1955 | Wise ..................................... 15/250.38 |
| 3,138,817 | 6/1964 | Wise ..................................... 15/250.38 |
| 3,192,551 | 7/1965 | Appel ................................... 15/250.43 |
| 3,392,415 | 7/1968 | Shipmann ............................ 15/250.38 |
| 4,127,916 | 12/1978 | van den Berg et al. ............. 15/250.43 |

FOREIGN PATENT DOCUMENTS

| | | | |
|---|---|---|---|
| 935297 | 11/1955 | Germany ............................ 15/250.38 |
| 2309063 | 8/1974 | Germany .......................... 15/250.454 |
| 932236 | 7/1963 | United Kingdom ................ 15/250.48 |

*Primary Examiner*—Gary K. Graham
*Attorney, Agent, or Firm*—Michael J. Striker

[57] ABSTRACT

A windshield wiper blade (10) is proposed for the cleaning of windshields of motor vehicles. The windshield wiper blade has an elongated, flexible support element (12), and is provided with devices for connecting a powered wiper arm (14). An elongated wiper lip strip, made of rubber-like material, having a tip and a wiper strip lip is disposed on the support element and is equipped with an elongated spring runner enclosed by the tip. A simple means of mounting the wiper blade results, if the spring runner (30) is disposed in a prefabricated longitudinal channel (28) penetrating the entire length of the tip (24), and further if the spring runner (30) projects with its two ends (32, 33) from the tip (24), and if further these two ends (32, 33) of the spring runner (30) form support devices to secure the wiper strip (18) on the support element (12).

12 Claims, 2 Drawing Sheets

WINDSHIELD WIPER BLADE

BACKGROUND OF THE INVENTION

The invention relates to a wiper blade. In a known wiper blade of this species (U.S. Pat. No. 4,127,916, FIGS. 21 to 23), the spring runner enclosed by the tip of the wiper strip is of the same length as the wiper strip. Therefore special embodiments of the support element and/or the tip held by the claws of the support element are necessary, so that the wiper strip is secured at the support element in its longitudinal direction. But nothing therein has been disclosed in connection with this. Also in this case, the spring runner is imbedded in the tip of the wiper strip, i.e. becoming integrally embodied right at its production. For this reason it must already be considered during the production process of the wiper strip what type of windshield the wiper blade is to service, so that the spring runner can fulfill its principal task—to provide the best possible even distribution of the bearing force over the entire length of the wiper strip—. The choice of spring runner depends upon a plurality of criteria, including for example the spherical curvature of the windshield to be wiped and the sloping of the windshield with regard to the air stream. This results in an uneconomic inventory keeping of windshield wiper blades, if customer demands are to be satisfied on a short-term basis.

SUMMARY OF THE INVENTION

Accordingly, it is an object of present invention to provide a wiper blade which eliminates the disadvantage of the prior art.

In keeping with these objects in the wiper blade the spring runner is arranged in a longitudinal channel penetrating the entire length of the tip, and it protrudes with its two ends from the tip formed support devices that secure the wiper strip on a support element.

When the windshield wiper blade is designed in accordance with the present invention it allows the possibility of introducing a spring runner into the longitudinal channel of the prefabricated wiper strip in accordance with customer requests. This simplifies the upkeep of the inventory. In addition, it allows by simple means to a achieve a securing of the spring runner-loaded wiper strip on the support element.

For a longitudinally moveable lock of the spring runner in the longitudinal channel of the wiper strip, the cross section of the spring runner is at least partially larger than the cross section of the prefabricated longitudinal channel.

A simple way of an even distribution of the bearing force over the entire wiper blade length can be achieved if the cross section of the spring runner tapers from the mid-section down to the end.

In this case, for practical purposes, the tapering of the spring runner cross section should be kept even.

A particularly simple embodiment of the mounting between the support element and the wiper strip is achieved, if the one end section of the support element has a stem facing the windshield and extending past the mouth of the longitudinal channel, on which counter support devices are arranged, which cooperate with the one end of the spring runner embodied as support device.

In accordance with one embodiment of the invention for the formation of easier to assemble counter support devices, the latter are formed by means of an opening penetrated by the one end of the spring runner.

In order to enable the end user to easily replace the worn-out wiper strip of the wiper blade, the other end section of the support element has an opening facing the windshield which is located at least in near proximity opposite a corresponding opening in the other end of the spring runner and when both openings by means of securing devices are fixed in reference to each other. After releasing the securing devices, the wiper strip along with the spring runner can be removed and can be replaced by a so-called "refill-set" —consisting of a wiper strip with a spring runner assembly—.

The securing devices are practically and cost-effectively constituted by a tension clip which is essentially U-shaped in cross section and made of a flexible material whose two U-legs have a detent cam or detent tooth as securing device on the two sides of their free ends facing each other, which when pre-loaded, work together with the openings serving as counter detent device in the support element and the spring runner. In order to prevent a deformation of the operating wiper strip in the wiping direction, stabilizing devices are arranged on the support element, covering at least partial areas of the lateral sides of the tip with support walls.

For purposes of easier assembly, the arrangement in the mid-section of the support element of these stabilizing devices can be outfitted with connecting devices for the driven wiper arm.

Advantageous further developments and embodiments of the invention are shown in the following description of an exemplary embodiment represented in the related drawings.

DESCRIPTION OF THE PREFERRED EMBODIMENT

Figure 1:
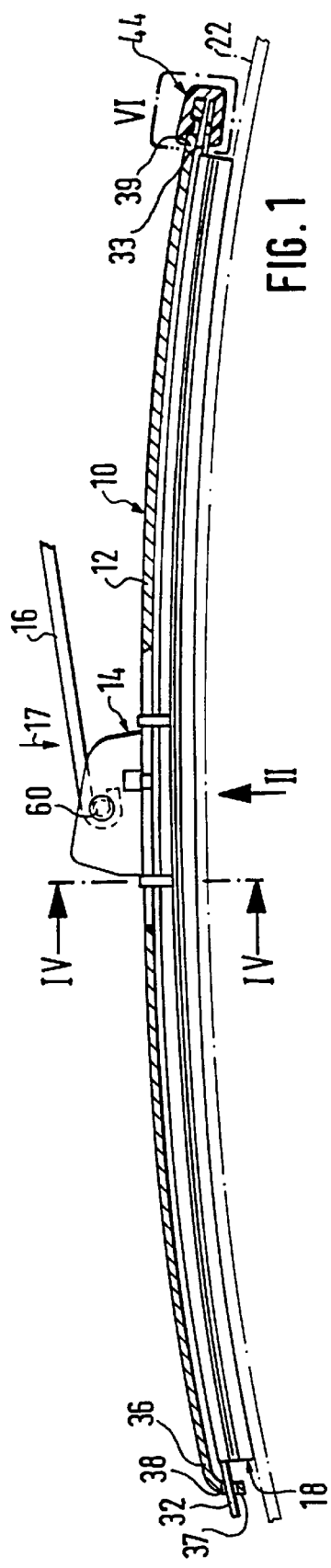
In FIG. 1, a lateral view of a wiper blade with its support element being shown longitudinally in sections, In FIG. 2, a view of the wiper blade in the direction of the arrow II in FIG. 1, In FIG. 3, a top view of the wiper blade in accordance with FIG. 1, In FIG. 4, a cross section of the wiper blade in accordance with FIG. 1 along the line IV—IV in FIG. 1, In FIG. 5, a basic view in perspective, not to scale, of a spring runner as a part of the wiper strip, and In FIG. 6, an enlargement of the detail shown in FIG. 1, marked as VI.
Figure 2:
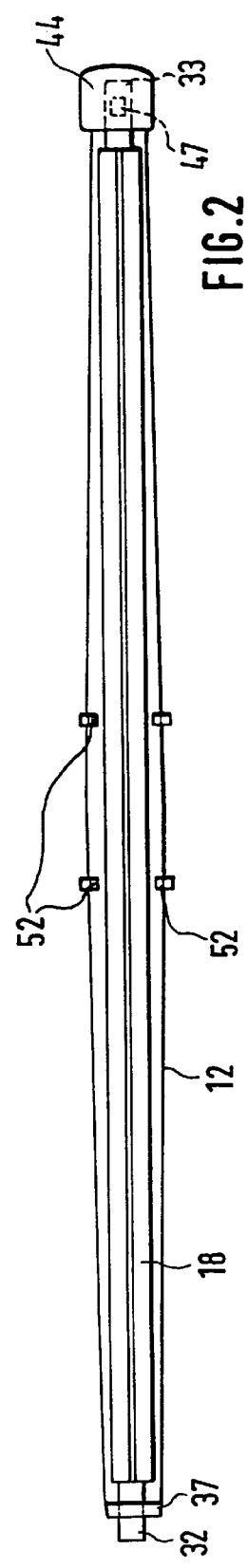
Figure 3:
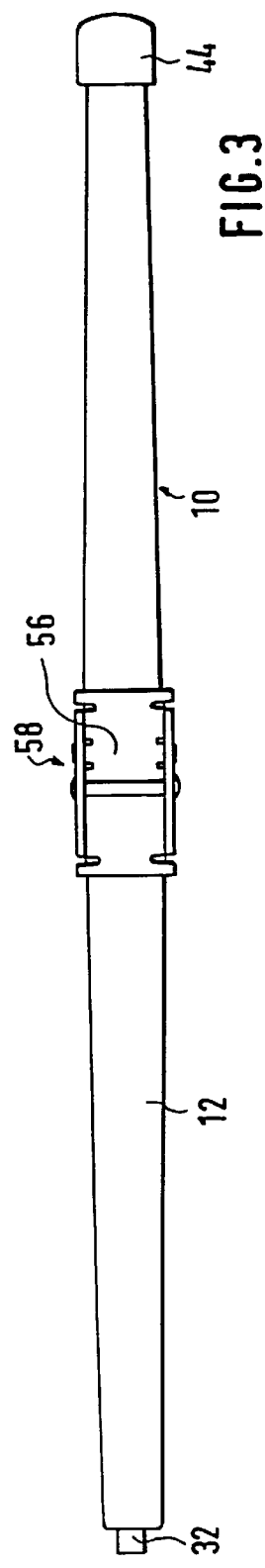
Figure 4:
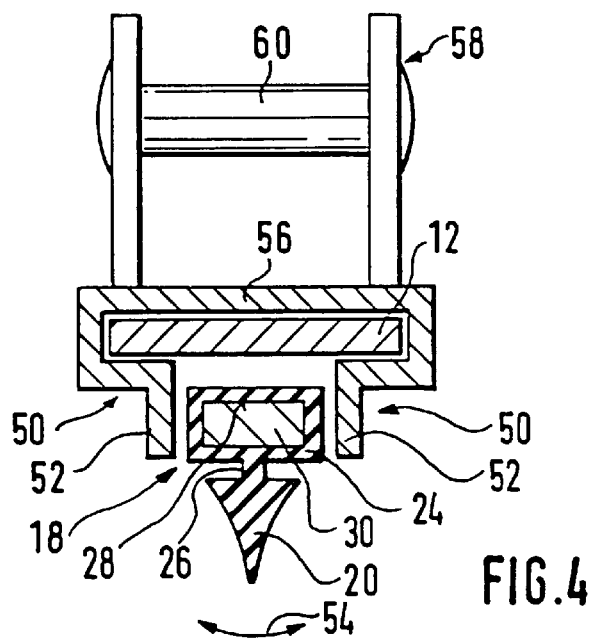
Figure 5:
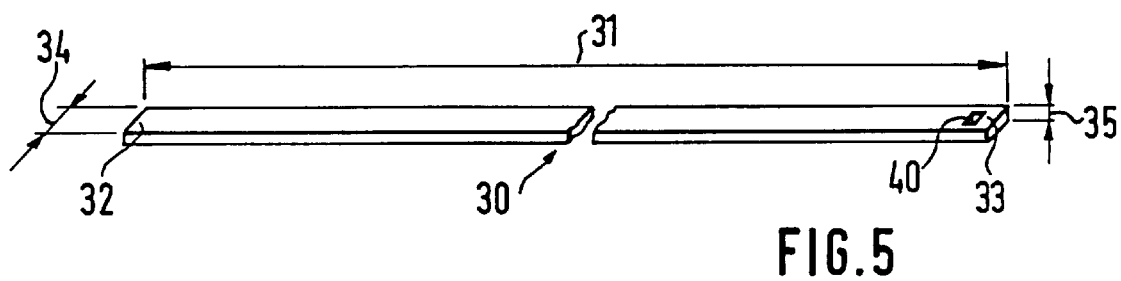

A wiper blade 10 shown in FIG. 1 has a single frame-like support element 12 which has an elongated shape and is made of flexible material. The support element 12 has connecting devices 14 at its mid-section, on which a powered wiper arm 16 acts in a manner known per se. The wiper arm 16 is loaded in the direction of an arrow 17, so that a wiper strip 18 held by a support element 12 makes contact with a wiper lip strip 20 on the outer surface of a motor vehicle windshield 22 to be wiped. The wiper strip 18 has a tip 24 (FIG. 4), on whose side facing the windshield 22 to be wiped the wiper lip strip 20 is connected by way of an elongated brace 26. The tip 24 of the wiper strip 18 made of a rubber-like material is penetrated by a longitudinal channel 28, in which an also elongated spring runner 30 is disposed. The spring runner 30 also provides the stabilizing effect of the wiper strip 19 transversely to its longitudinal extension. The main function of the spring runner 30 is, however, to provide the best possible even distribution of the bearing force of the wiper lip strip 20 on the windshield 22. The length 31 (FIG. 5) of the spring runner 30 is of such dimensions, that its two ends 32, 33 extend from the two mouths of the longitudinal channel 28 existing in the tip 24. So that the spring runner 30 is secured against longitudinal shifts in the longitudinal channel 28, its cross section is at least partially larger than the cross section of the prefabricated longitudinal channel 28 in the tip 24. So that the bearing force (arrow 17, FIG. 1) is distributed as evenly as possible over the entirety of the longitudinal extension of the wiper strip 18, the cross section of the spring runner 30 tapers from its mid-section to the ends 32 and 33. This tapering, which cannot be readily identified in the drawings (FIG. 5) because of its minor difference, which is actually difficult to recognize, can take place gradually as well as continuously. The tapering of the cross section can be achieved in that the spring runner width 34 is tapering and/or by reducing the thickness 35 of the spring runner 30.

Figure 6:
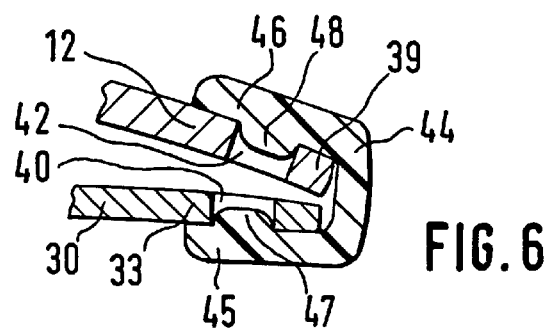

As shown in FIG. 1, the one end section 36 of the support element 12 is provided with a stem 37, oriented toward the windshield 22 and extending over the mouth of the longitudinal channel 28, its extension to the longitudinal channel 28 having a opening 38 which is penetrated by one end 32 of the spring runner 30. The other end 33 of the spring runner 30 has an opening 40 opposite which an opening 42 at the other end 39 of the support element 12 is located. The two openings 40 and 42 essentially point toward the windshield 22. In order to secure the spring runner 30 in respect to the support element 12, a tension clip 44 with an approximately U-shaped cross section is provided. The two U-legs 45 and 46 of the tension clip 44 (FIG. 6) made of a flexible material are fitted with a detent tooth 47 or with a detent cam 48 on the sides in the area of their free ends facing each other. The detent cam 48 is associated with the opening 42 in the end 39 of the support element 12. The detent tooth 47 matches the opening 40 in the end 33 of the spring runner 30. The tension clip 44 is arranged in such a way that under flexible deflection of its two U-legs 45, 46 it can be assembled in the same way as is shown in FIG. 6. The detent tooth 47 thus moves into the opening 40 of the spring runner 30, and the detent cam 48 into the opening 42 in the end-section 39 of the support element 12. The tension clip 44, together with the end-section 39 of the support element 12 and the end 33 of the spring runner 30, thus forms a support device for securing the wiper strip 18 on the support element 12. The one end-section 36 of the support element 12, together with the stem 37 provided with the opening 38, acting jointly with the end 32 of the spring runner 30 extending through the opening 38, forms a means for holding and securing the wiper strip 18 on the support element 12. Thus the wiper strip 18 is freely suspended between the two support or securing devices 32, 36, 37, 38 or respectively 33, 39, 44, so that it can optimally adjust to the curvature of the windshield 22 when bearing force is applied (arrow 17). The detent tooth 47 resting in the opening 40 as well as the detent cam 48 which sits in the opening 42 create securing devices against unintentional loosening of the tension clip 40 from its operating position shown in FIG. 4, because its U-legs 45 and 46 rest preloaded toward each other on the support element 12 and on the spring runner 30, securing the two components to each other.

Additional stabilizing devices 50 (FIG. 4) are arranged on the support element 12, which serve as further improved stabilization of the wiper strip 18 transversely to its longitudinal extension in the direction of the operating movement of the wiper blade. These stabilizing devices 50, which are arranged in the longitudinal center area of the wiper blade 10, enclose the support element 12 (FIG. 4) in a claw-like manner and have support walls 52 on each side of the tip 24, which face the windshield and cover parts of the longitudinal side of the tip 24. Thus a possible sag of the wiper blade 18 in operational direction (viewed in the direction of the two-headed arrow 54 in FIG. 4) can be limited or respectively prevented by means of the support walls 52. On a base plate 56 of the stabilizing devices 50 extending along the side of the support element 12 facing away from the windshield 22 connecting devices 58, known per se, for a hook-shaped end of the wiper arm 16 are attached. In the exemplary embodiment, these connecting devices 58 are formed by two walls 60 extending parallel in respect to each other, which are arranged spaced apart from each other and are joined together by a connecting bolt 60. The hook-shaped end of the wiper arm 16 acts on the connecting bolt 60.

By way of a special layout with regard to its cross section and its material selection of the support element 12 made of a flexible material, a particularly good and even distribution of the bearing force can be achieved in connection with a specific matching between the spring runner 30 made of flexible material and possibly an appropriate prestressing of the spring runner against the windshield 22.

The arrangement of the tension clip 44 as detachable securing element allows the end user to exchange the wiper strip 18 together with the integrated spring runner without problems, since after taking off the tension clip 44, the "refill-set" consisting of wiper strip 18 and spring runner 30 can be easily removed. This can be done by merely pulling the end 32 of the spring runner 30 out of the opening 38 of the stem 37. Mounting of a new refill-set is done in reverse order.

I claim:

1. A windshield wiper blade, comprising an elongated flexible support element connectable to a powered wiper arm; an elongated wiper strip composed of a rubber material and having a tip and a wiper strip lip placeable on a windshield, said tip having a longitudinal channel extending over an entire length of said tip; a spring runner arranged in said longitudinal channel and having two ends protruding outwardly beyond said tip and securing said wiper strip on said support element, said support element having one end section provided with an opening facing said spring runner, said spring runner being provided with a corresponding opening at an adjacent end of said spring runner; and securing means extending through said openings to secure said end section of said support element and said adjacent end of said spring runner, said securing means comprising a tension clip.

2. A windshield wiper blade as defined in claim 1, wherein said tension clip is a substantially U-shaped tension clip composed of a flexible material and including two legs each having a detent element cooperating with said openings.

3. A windshield wiper blade as defined in claim 2, wherein said detent element is a detent cam.

4. A windshield wiper blade as defined in claim 2, wherein said detent element is a detent tooth.

5. A windshield wiper blade as defined in claim 1, wherein said spring runner is arranged under prestress.

6. A windshield wiper blade as defined in claim 1, wherein said spring runner has a transverse cross-section which is at least partially larger than a transverse cross-section of said longitudinal channel in said tip.

7. A windshield wiper blade as defined in claim 1, wherein said spring runner has a transverse cross-section which tapers starting from a mid-section toward said ends.

8. A windshield wiper blade as defined in claim 7, wherein said transverse cross-section of said spring runner tapers off evenly.

9. A windshield wiper blade as defined in claim 1, wherein said support element has another end section which is provided with a stem adapted to face a windshield and projecting past a mouth of said longitudinal channel; and a counter support means provided on said other end section of said support element and cooperating with another end of said spring runner.

10. A windshield wiper blade as defined in claim 9, wherein said counter support means is formed as an opening, through which said other end of said spring runner extends.

11. A windshield wiper blade as defined in claim 1, wherein said support element is provided with stabilizing means which cover at least partially areas of longitudinal sides of said tip by support walls.

12. A windshield wiper blade as defined in claim 11, wherein said stabilizing means is located in a mid-section of said support element and provided with connecting means for the powered wiper arm.

* * * * *